3,505,455
NEMATOCIDAL METHOD

Edward Gipstein, Saratoga, Calif., and Joseph V. Karabinos, Orange, Conn., assignors, by mesne assignments, to The Ansul Company, a corporation of Wisconsin
No Drawing. Filed Dec. 15, 1966, Ser. No. 601,841
Int. Cl. A01n 9/20
U.S. Cl. 424—321                10 Claims

ABSTRACT OF THE DISCLOSURE

Soil nematodes are controlled by applying to the infected soil effective amounts of aryl sulfonanilides having the formula

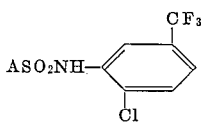

where A is monovalent aryl having 6 to 10 carbons.

---

This invention relates to compositions and methods for the control of plant pathogenic nematodes employing as essential active ingredients certain aryl sulfonanilides as described below.

Nematodes are not insects and are not classed as insects. Nematocides are not classed as insecticides and are not subject to the regulations of the U.S. Department of Agriculture for insecticides.

Nematodes are round worms which infest soil and attack plants throughout the world. Plants infected by pathogenic nematodes have a weak, sickly appearance. The roots of affected plants are stunted. Numerous galls, knots or lesions form on the roots. The plant may appear nutritionally deficient. The discovery of the nematocidal properties of the compounds used according to this invention was not obvious from the prior art because there is no known correlation between the structure of a compound and its nematocidal properties or even between insecticidal and nematocidal compounds.

Methods and compositions heretofore known for the control of nematodes have usually been either inconvenient to use or too expensive for widespread application. Many nematocides are highly injurious not only to man and animals but are phytotoxic to plants and seeds. It is especially unexpected to discover effective nematocides which are substantially non-toxic to plants. The disadvantages of the prior art compositions and methods are avoided according to this invention by treating soil infested with nematodes with one or more compounds having the formula:

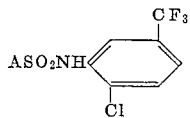

where A is monovalent aryl having 6 to 10 carbons. The aryl can be monocyclic or bicyclic and the rings can be condensed, for example, in 1-naphthyl. Other examples of suitable monovalent aryl are phenyl, tolyl, xylyl and 2-naphthyl. Monovalent aryl also suitably includes halogenated aryl, for example, 2-chlorophenyl, 3-fluorophenyl, 4-bromophenyl, 2,4-dibromo-1-naphthyl, 1-chloro-2-naphthyl and 5-chloro-2-naphthyl.

Examples of suitable compounds of the above formula include:

2,4'-dichloro-5-trifluoromethylbenzene sulfonanilide
2,3',4'-trichloro-5-trifluoromethylbenzene sulfonanilide
2-chloro-5-trifluoromethylbenzene sulfonanilide
2-chloro-4'-bromo-5-trifluoromethylbenzene sulfonanilide
2-chloro-5-trifluoromethyl-2-naphthalene sulfonanilide
2-chloro-3'-fluoro-5-trifluoromethyl-1-naphthalene sulfonanilide The compounds used according to this invention are prepared by the reaction of 2-chloro-5-trifluoromethylaniline with the selected aryl sulfonyl halide in the presence or absence of inert diluent but in the presence of an acid neutralizing agent. Two equivalents of the aniline per equivalent of the aryl sulfonyl halide provide the acid neutralizing agent. Only one equivalent of aniline is required in the presence of aqueous alkali, pyridine, triethylamine or other acid neutralizing agents. Alcoholic sodium acetate or pyridine are particularly preferred since they act as both solvents and acid neutralizing agents for the reaction. Conveniently, the aryl sulfonyl halide dissolved or suspended in the inert diluent is added to a mixture of 2-chloro-5-trifluoromethylaniline in the inert diluent. The reverse order of addition is also suitable. Cooling is usually appropriate during the addition followed by a period of refluxing. Preferably, the temperature during the addition is maintained below 50° C. Preferably the mixture is then heated at about 75 to 80° C. for about 1.5 hours. The product usually separates as a solid which is removed by filtration. Other methods of separation are used when appropriate. Oils are separated and/or extracted followed by distillation and/or crystallization. When desired, the sulfonanilides are recrystallized from any appropriate solvent, for example, ethyl alcohol, acetone or mixtures thereof. Alternatively, purification by dissolving in aqueous ammonia and reprecipitating with hydrochloric acid is suitable.

Suitable inert diluents are well-known to those skilled in the art and include, for example, petroleum ether, ethyl ether, methyl isopropyl ether, di-isopropyl ether, benzene, toluene, chlorobenzenes and tetrachloroethane.

Certain compounds of the type defined above and method of preparing them are disclosed in German Auslegeschrift 1,062,238.

In use these compounds are applied to areas to be protected from nematodes in any of a variety of formulations. Preferably the compounds are extended with carriers or conditioning agents of the kind used and commonly referred to in the art as adjuvants or modifiers. Such adjuvants are inert solids, surface-active agents and organic liquids.

One or more of the sulfonanilides of this invention are incorporated in such compositions in sufficient amount to exert a nematocidal effect. Usually from about 1 to 95% by weight of the compounds are included in such formulations.

Solid formulations are prepared with inert powders. The formulations thus prepared are used as such, diluted further with inert solids to form dusts, or suspended in a suitable liquid medium for spray application.

The powders usually comprise the active ingredient admixed with minor amounts of conditioning agents. Neutral clays, for example, the absorptive attapulgite or the relatively non-absorptive china clays, diatomaceous earth, walnut shell flour, redwood flour, synthetic fine silica, calcium silicate and other inert solid carriers of the kind conventionally employed in powder formulations as used. Industrial fertilizers and dry soil are useful as conditioning agents.

The active ingredient is suitably about 1 to 95% by weight of the compositions. The solids preferably are finely divided and have a particle size below about 50 microns or better below about 20 microns. Dust formulations are prepared using talc, pyrophyllite, tobacco dust, volcanic ash or other dense, inert solids as diluents.

Liquid compositions are prepared by mixing the active compounds with suitable liquid diluent media. The active compound is either in solution or in suspension in the liquid medium. Suitable liquid media include kerosene, Stoddard solvent, xylene, alcohols, alkylated naphthalenes, diesel oil, glycols and ketones, for example, diisobutyl ketone and cyclohexanone. The active ingredient is preferably from about 0.5 to 50% of these liquid compositions. These compositions are used as such or extended by emulsification with water.

Nematocidal wettable powders or liquids suitably include one or more surface-active agents, for example, wetting, dispersing, or emulsifying agents. Compositions containing these surface-active agents dispense or emulsify easily in water to form aqueous sprays. The compositions suitably contain up to 10% by weight of the surface-active agents but some surface-active agents are effective at less than 1%.

Surface-active agents are suitably of the anionic, cationic, or nonionic type. Examples include sodium oleate, sulfonated petroleum oils, alkyl aryl sulfonates, sodium lauryl sulfate, polyethylene oxides, lignin sulfonates, and other surface-active agents. Additional suitable agents are described by McCutcheon in "Soap and Chemical Specialties," volume 31, Nos. 7–10 (1955).

Nematocidal compositions are applied to cultivated land and mixed with top soil. The rate of application is sufficient to exert the desired nematocidal action. Dosage depends on the particular active ingredient, components of the formulation, method of application, type and quantity of nematodes, duration of treatment, climatic conditions and lesser factors. Application rates of from 1 to 50 pounds per acre are usually satisfactory for nematode control, but higher rates are also used. After application, the compositions are worked into the ground to a depth of 4 to 6 inches.

EXAMPLE I

Treated soil was prepared by mixing 0.5 gram of the chemical to be tested with one gallon of steam-sterilized soil. Flats were prepared with treated and untreated soil. Both were inoculated with Meloidogyne spp., the common root knot nematode.

A group of transplanted tomato plants were planted in treated and untreated soil and were examined after one month's growth. Cucumber seedlings were similarly grown in treated and untreated soil. Both were rated as follows:

| Rating | | Plants having galls, percent |
|---|---|---|
| Word | Number | |
| Excellent | 0 | 0 |
| Good | 1 | Under 25 |
| Fair | 2 | 25–50 |
| Poor | 3 | Over 50 |

Tested as described, 2,4'-dichloro-5-trifluoromethylbenzene sulfonanilide was rated 0, 1, 1, 0 in two replicates on each plant which is very good control of nematodes. No phytotoxicity was observed.

EXAMPLE II

Tested as described in Example I, 0.5 gram of 2,3',4'-trichloro-5-trifluoromethylbenzene sulfonanilide per gallon of soil was rated 1, 1, 1, 1 in replicates which is good control.

No phytotoxicity was observed.

EXAMPLE III

Tested as described in Example I, the tomato and cucumber roots showed 0 to 25% galls (good control) when grown in the soil treated with 0.5 gram of 2-chloro-5-trifluoromethylbenzene sulfonanilide per gallon of soil but 50 to 100% galls in the untreated soil.

No phytotoxicity was observed.

EXAMPLE IV

Tested as described in Example I, 0.5 gram of 2-chloro-4'-bromo-5-trifluoromethylbenzene sulfonanilide showed excellent control of nematodes. Ratings were 0, 0, 0, 0. No phytotoxicity was observed.

EXAMPLE V

Tested as described in Example I, 0.5 gram of 2-chloro-5 - trifluoromethyl - 2 - naphthalene sulfonanilide showed good control of nematodes. Ratings were 0, 1, 1, 0.

No phytotoxicity was observed.

EXAMPLE VI

A nematocidal powder is prepared by blending 75 parts of the compound of Example I with 20 parts of fine attapulgite clay, 2 parts of alkylated naphthalene sulfonic sodium salt wetting agent, 0.2 part of low viscosity methyl cellulose dispersant and 2.8 parts of disodium phosphate. The mixture is ground to an average particle size of about 50 microns and blended until homogeneous.

About 5 pounds of this formulation is dispersed in 100 gallons of water and applied at a rate of 50 pounds of active ingredient per acre to land infested with pathogenic nematodes. The soil is then disced. Cucumbers grown in the treated soil are normal and free from nematode infection.

EXAMPLE VII

An aqueous suspension is prepared by mixing the compound of Example II with the other ingredients listed below and then wet milling the mixture.

| | Parts |
|---|---|
| Compound of Example II | 30 |
| Sodium lignosulfonate | 15 |
| Fuller's earth | 3.3 |
| Low viscosity methyl cellulose | 0.5 |
| Disodium phosphate | 1.0 |
| n-Octyl alcohol | 0.2 |
| Water | 50.0 |

This suspension mixes readily with water to form substantially non-flocculating aqueous dispersions. Applied using conventional spray equipment at a rate of 40 pounds of active agent per acre, substantially complete control of nematodes is obtained.

EXAMPLE VIII

An emulsifiable oil composition is prepared by blending the compound of Example III, wetting agent and oil together until a completely homogeneous mixture is obtained.

| | Parts |
|---|---|
| Compound of Example III | 33 |
| Polyoxyethylene sorbitan trioleate | 11 |
| Stoddard solvent | 56 |

This composition disperses in water to form an emulsion suitable for application as a spray. Diluting 1 part with 5 parts water and applying 40 gallons of active ingredient per acre, substantially complete control of nematodes is obtained.

EXAMPLE IX

A nematocidal dust is prepared by blending the compound of Example IV with the diluents listed below and micropulverizing the mix to an average particle size of about 30 microns. The resulting mixture is suitably applied with ordinary dusting equipment.

| | Parts |
|---|---|
| Compound of Example IV | 15 |
| Diatomaceous silica | 20 |
| Pyrophyllite | 60 |
| Lauryl alcohol | 5 |

EXAMPLE X

The procedure of Example IX when repeated using 10 parts of the compound of Example V and 5 parts of the

What is claimed is:

1. Method for the control of nematodes in soil comprising applying to said soil infested with nematodes a nematocidal amount of a sulfonanilide having the formula

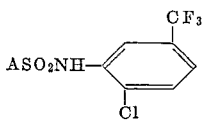

wherein A is a monovalent aryl having 6 to 10 carbon atoms selected from the group consisting of 1-naphthyl, phenyl, tolyl, xylyl, and 2-naphthyl.

2. Method as claimed in claim 1 in which said sulfonanilide is applied at the rate of 1 to 50 pounds per acre.

3. Method as claimed in claim 1 in which said sulfonanilide prior to being applied to the soil infested with nematodes is diluted to a composition containing 1 to 95% by weight of said sulfonanilide, the balance being selected from the group consisting of inert solid carriers and surface-active agents.

4. Method as claimed in claim 1 in which A in said formula is a halogenated monovalent aryl selected from the group consisting of 2-chlorophenyl, 3-fluorophenyl, 4-bromophenyl, 2,4-dibromo-1-naphthyl, 1-chloro-2-naphthyl and 5-chloro-2-naphthyl.

5. Method as claimed in claim 1 in which said sulfonanilide is 2,4′-dichloro-5-trifluoromethylbenzene sulfonanilide.

6. Method as claimed in claim 1 in which said sulfonanilide is 2,3′,4′-trichloro-5-trifluoromethylbenzene sulfonanilide.

7. Method as claimed in claim 1 in which said sulfonanilide is 2-chloro-5-trifluoromethylbenzene sulfonanilde.

8. Method as claimed in claim 1 in which said sulfonanilide is 2-chloro-4′-bromo-5-trifluoromethylbenzene sulfonanilide.

9. Method as claimed in claim 1 in which said sulfonanilide is 2-chloro-5-trifluoromethyl-2-naphthalene sulfonanilide.

10. Method as claimed in claim 1 in which said sulfonanilide is 2-chloro-3′-fluoro-5-trifluoromethyl-1-naphthalene sulfonanilide.

References Cited

UNITED STATES PATENTS

| | | | |
|---|---|---|---|
| 2,435,274 | 2/1948 | Hester | 167—30 |
| 3,034,955 | 5/1962 | Frick et al. | 167—37 |

ALBERT T. MEYERS, Primary Examiner

A. J. ROBINSON, Assistant Examiner